United States Patent
Zimmer et al.

(10) Patent No.: US 10,091,435 B2
(45) Date of Patent: Oct. 2, 2018

(54) VIDEO SEGMENTATION FROM AN UNCALIBRATED CAMERA ARRAY

(71) Applicant: Disney Enterprises, Inc., Burbank, CA (US)

(72) Inventors: Henning Zimmer, Zurich (CH); Alexander Sorkine Hornung, Zurich (CH); Mario Botsch, Bielefeld (DE); Federico Perazzi, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 21 days.

(21) Appl. No.: 15/176,017

(22) Filed: Jun. 7, 2016

(65) Prior Publication Data

US 2017/0353670 A1   Dec. 7, 2017

(51) Int. Cl.
*H04N 5/247* (2006.01)
*G06T 7/55* (2017.01)
(Continued)

(52) U.S. Cl.
CPC .............. *H04N 5/247* (2013.01); *G06T 7/11* (2017.01); *G06T 7/143* (2017.01); *G06T 7/215* (2017.01);
(Continued)

(58) Field of Classification Search
CPC ...... H04N 13/0271; H04N 5/275; H04N 9/75; H04N 5/247; H04N 5/272; G06T 7/55;
(Continued)

(56) References Cited

U.S. PATENT DOCUMENTS 5,077,608 A * 12/1991 Dubner ............... H04N 5/2628
    345/419
5,259,040 A * 11/1993 Hanna ................... G06K 9/209
    375/240.12

(Continued)

OTHER PUBLICATIONS

Bai, X., et al. 2009. "Video SnapCut: robust video object cutout using localized classifiers". ACM Transaction on Graphics 28, 3, 70:1-70:11.

(Continued)

*Primary Examiner* — David Harvey
(74) *Attorney, Agent, or Firm* — Patterson + Sheridan, LLP

(57) ABSTRACT

The disclosure provides an approach for image segmentation from an uncalibrated camera array. In one aspect, a segmentation application computes a pseudo depth map for each frame of a video sequence recorded with a camera array based on dense correspondences between cameras in the array. The segmentation application then fuses such pseudo depth maps computed for satellite cameras of the camera array to obtain a pseudo depth map at a central camera. Further, the segmentation application interpolates virtual green screen positions for an entire frame based on user input which provides control points and pseudo depth thresholds at the control points. The segmentation application then computes an initial segmentation based on a thresholding using the virtual green screen positions, and refines the initial segmentation by solving a binary labeling problem in a Markov random field to better align the segmentation with image edges and provide temporal coherency for the segmentation.

25 Claims, 7 Drawing Sheets

(51) Int. Cl.
    G06T 7/11      (2017.01)
    G06T 7/143     (2017.01)
    G06T 7/215     (2017.01)
(52) U.S. Cl.
    CPC ...... *G06T 7/55* (2017.01); *G06T 2207/30181* (2013.01)
(58) Field of Classification Search
    CPC . G06T 7/11; G06T 7/143; G06T 7/215; G06T 2207/10028
    See application file for complete search history.

(56) References Cited

U.S. PATENT DOCUMENTS

| | | | | |
|---|---|---|---|---|
| 5,426,467 | A * | 6/1995 | Moriwake | H04H 60/04 348/584 |
| 6,556,704 | B1 * | 4/2003 | Chen | G06K 9/20 382/154 |
| 6,668,080 | B1 * | 12/2003 | Torr | G06T 17/10 382/107 |
| 7,602,990 | B2 * | 10/2009 | Matusik | H04N 5/272 348/159 |
| 7,826,668 | B1 * | 11/2010 | Zaklika | G06T 11/60 345/619 |
| 9,443,316 | B1 * | 9/2016 | Takeda | G06T 7/11 |
| 9,679,390 | B2 * | 6/2017 | Peeper | G06T 7/194 |
| 9,741,125 | B2 * | 8/2017 | Baruch | G06T 7/136 |
| 9,922,681 | B2 * | 3/2018 | Middleton | G11B 27/031 |
| 2003/0007560 | A1 * | 1/2003 | Mayhew | G06T 7/20 375/240.08 |
| 2009/0297061 | A1 * | 12/2009 | Mareachen | G06T 11/00 382/285 |
| 2010/0220921 | A1 * | 9/2010 | Blake | G06K 9/00234 382/154 |
| 2011/0109720 | A1 * | 5/2011 | Smolic | H04N 13/0011 348/43 |
| 2011/0249190 | A1 * | 10/2011 | Nguyen | H04N 5/272 348/708 |
| 2011/0274366 | A1 * | 11/2011 | Tardif | G06T 5/002 382/260 |
| 2012/0127267 | A1 * | 5/2012 | Zhang | G06T 7/0071 348/43 |
| 2012/0162412 | A1 * | 6/2012 | Kim | G06T 7/11 348/135 |
| 2012/0281906 | A1 * | 11/2012 | Appia | G06T 7/593 382/154 |
| 2013/0084006 | A1 * | 4/2013 | Zhang | G06T 7/0081 382/173 |
| 2013/0129213 | A1 * | 5/2013 | Shechtman | G06T 7/0028 382/167 |
| 2013/0258062 | A1 * | 10/2013 | Noh | H04N 13/0022 348/47 |
| 2014/0233915 | A1 * | 8/2014 | Middleton | G11B 27/031 386/282 |
| 2015/0070467 | A1 * | 3/2015 | Crowder | G06T 5/10 348/46 |
| 2015/0117717 | A1 * | 4/2015 | Cho | G06K 9/00201 382/106 |
| 2015/0254868 | A1 * | 9/2015 | Srikanth | G06T 7/0081 348/47 |
| 2015/0379720 | A1 * | 12/2015 | Herraez | G06T 7/0069 348/43 |
| 2016/0065943 | A1 * | 3/2016 | Yim | H04N 13/0271 348/46 |
| 2016/0171706 | A1 * | 6/2016 | Somanath | G06T 7/11 382/154 |

OTHER PUBLICATIONS

Bay, H., et al. 2008. "Speeded-up robust features (SURF)". Computer Vision and Image Understanding 110, 3, 346-359.

Bookstein, F. L. 1989. "Principal warps: Thin-plate splines and the decomposition of deformations". IEEE Transactions on Pat-tern Analysis and Machince Intelligence 11, 6, 567-585.

Boykov, Y., et al. 2001. "Interactive graph cuts for opti587 mal boundary and region segmentation of objects in N-D images". In Proc. of IEEE International Conference on Computer Vision (ICCV), 105-112.

Boykov, Y., et al. 2004. "An experimental comparison of min-cut/max-flow algorithms for energy minimization in vision". IEEE Transactions on Pattern Analysis and Machince Intelligence 26, 9, 1124-1137.

Brox, T., et al. 2004. "High accuracy optical flow estimation based on a theory for warping". In Proc. of European Conference on Computer Vision (ECCV), 25-36.

Chuang, Y., et al. 2002. "Video matting of complex scenes". ACM Transaction on Graphics 21, 3, 243-248.

Fan, Q., et al. 2015. "JumpCut: Non-successive mask transfer and interpolation for video cutout". ACM Transaction on Graphics 34, 6, 195:1-195:10.

Fischler, M., et al. 1981. "Random sample consensus: A paradigm for model fitting with applications to image analysis and automated cartography". Communications of the ACM 24, 6, 381-395.

Ghasemi, A., et al. 2014. "Computationally efficient background subtraction in the light field domain". In Proc. of SPIE Computational Imaging.

Gortler, S. J., et al. 1996. "The lumigraph". In Proc. of ACM SIGGRAPH, 43-54.

Guillemaut, J., et al. 2012. "Space-time joint multilayer segmentation and depth estimation". In Proc. of International Conference on 3D Imaging, Modeling, Processing, Visualization and Transmission (3DIMPVT), 440-447.

Gupta, S., et al. 2014. "Learning rich features from RGB-D images for object detection and segmentation". In Proc. of European Conference on Computer Vision (ECCV), 345-360.

Horn, B. K. 1987. "Closed-form solution of absolute orientation using unit quatemions". Journal of the Optical Society of America 4, 4, 629-642.

Jarabo, A., et al. 2014. "How do people edit light fields?". ACM Transaction on Graphics 33, 4, 146:1-146:10.

Kim, C., et al. 2013. "Scene reconstruction from highspatio-angular resolution light fields". ACM Transaction on Graphics 32, 4, 73:1-73:12.

Levoy, M., et al. 1996. "Light field rendering". In Proc. of ACM SIGGRAPH, 31-42.

Li, Y., et al. 2004. "Lazy snapping". ACM Transaction on Graphics 23, 3, 303-308.

Li, Y., et al. 2005. "Video object cut and paste". ACM Transaction on Graphics 24, 3, 595-600.

May, S., et al. 2009. "Three-dimensional mapping with time-of-flight cameras". Journal of Field Robotics 26, 11-12, 934-965.

Min, D., et al. 2014. "Fast global image smoothing based on weighted least squares". IEEE Transactions on Image Processing 23, 12, 5638-5653.

Mustafa, A., et al. 2015. "General dynamic scene reconstruction from multiple view video". In Proc. of IEEE International Conference on Computer Vision (ICCV), 900-908.

Newcombe, R. A., et al. 2011. "KinectFusion: Real-timedense surface mapping and tracking". In Proc. of IEEE International Symposium on Mixed and Augmented Reality (ISMAR), 127-136.

Perazzi, F., et al. 2015. "Fully connected object proposals for video segmentation". In Proc. of IEEE International Conference on Computer Vision (ICCV), 11-18.

Rother, C., et al. 2004. "Grab-Cut: interactive foreground extraction using iterated graph cuts". ACM Transaction on Graphics 23, 3, 309-314.

Sawhney, H. S., 1994. "3d geometry from planar parallax". In Proc. of IEEE Conference on Computer Vision and Pattern Recognition (CVPR), 929-934.

Seitz, S. M., et al. 2006. "A comparison and evaluation of multi-view stereo reconstruction algorithms". In Proc. of IEEE Conference on Computer Vision and Pattern Recognition (CVPR), 519-528.

(56) References Cited

OTHER PUBLICATIONS

Shum, H., et al. 2004. "Pop-up light field: An interactive image-based modeling and rendering system". ACM Transaction on Graphics 23, 2, 143-162.
Silberman, N., et al. 2012. "Indoor segmentation and support inference from RGBD images". In Proc. of European Conference on Computer Vision (ECCV), 746-760.
Smith, A. R., et al. 1996. "Blue screen matting". In Proc. of ACM SIGGRAPH, 259-268.
Wang, J., et al. 2005. "Interactive video cutout". ACM Transaction on Graphics 24, 3, 585-594.
Wanner, S., et al. 2012. "Globally consistent depth labeling of 4d light felds". In Proc. of IEEE Conference on Computer Vision and Pattern Recognition (CVPR), 41-48.
Wanner, S., et al. 2013."Globally consistent multi-label assignment on the ray space of 4d light fields". In Proc. of IEEE Conference on Computer Vision and Pattern Recognition (CVPR), 1011-1018.
Zhang, G., et al. 2011. "Robust bilayer segmentation and motion/depth estimation with a handheld camera". IEEE Transactions on Pattern Analysis and Machince Intelligence 33, 3, 603-617.
Zhong, F., et al. 2012. "Discontinuity-aware video object cutout". ACM Transaction on Graphics 31, 6, 175:1-175:10.

\* cited by examiner

VIDEO SEGMENTATION FROM AN UNCALIBRATED CAMERA ARRAY

BACKGROUND

Field of the Invention

Techniques presented herein relate to the field of video processing. More specifically, this disclosure presents techniques for segmenting video frames captured by an uncalibrated camera array.

Description of the Related Art

Chroma keying using green screens is an important tool for simplifying video compositing and visual effects. Traditional chroma keying works by covering or painting parts of a set with a specific color (e.g., green), and then using color separation techniques to segment out the colored parts. Doing so simplifies the task of video segmentation, as compared to other techniques such as rotoscoping and matting, which usually require tedious manual effort. However, setting up green screens can be a significant and expensive effort, particularly for large outdoor sets. Further, for indoor sets, color spill from masked areas onto foreground objects is a common problem. In addition, actors tend to dislike green screens, which can create unnatural acting environments.

SUMMARY

One aspect of this disclosure provides a computer-implemented method for image segmentation from a camera array. The method generally includes receiving images captured by cameras in the camera array, and determining dense correspondences between pairs of the images captured at the same time by two or more cameras in the camera array. The method further includes computing one or more pseudo depth maps from the dense correspondences, where pseudo depths in each of the pseudo depth maps indicate relative depths of pixels with respect to other pixels in the pseudo depth map but not actual depth measurements. In addition, the method includes segmenting one or more of the images based on the computed pseudo depth maps.

Further aspects include a non-transitory computer-readable storage medium storing instructions that when executed by a computer system cause the computer system to perform the methods set forth above, and a computer system programmed to carry out the methods set forth above.

BRIEF DESCRIPTION OF THE DRAWINGS

So that the manner in which the above recited aspects are attained and can be understood in detail, a more particular description of aspects of this disclosure, briefly summarized above, may be had by reference to the appended drawings.

It is to be noted, however, that the appended drawings illustrate only typical aspects and are therefore not to be considered limiting of its scope, for the invention may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Aspects presented herein provide an approach for image segmentation from an uncalibrated camera array. In contrast to traditional green screens and chroma keying, a segmentation application obtains depth information for pixels of an image and performs a depth-based segmentation based on a "virtual" placement of a green screen after the image is captured. In one aspect, the segmentation application computes a pseudo depth map for each frame of a video sequence recorded with a camera array, based on dense correspondences between cameras in the array. As used herein, a pseudo depth generally refers to a depth ordering of pixels indicating a relative depth of each pixel with respect to other pixels in an image, without reconstructing actual depths of the pixels. Computing pseudo depths does not require geometric or photometric camera calibration (i.e., the camera array may be uncalibrated), and there is no metric meaning behind pseudo depths, i.e., the pseudo depths do not actually represent measures of distance from the camera. Further, the use of pseudo depths herein allows discontinuities in scene depth (e.g., around object silhouettes) to be sufficiently well represented and a desired scene segmentation to be intuitively defined and manipulated.

In one aspect, the segmentation application computes dense correspondence as optical flows from each satellite camera of the camera array to the left and right neighbors of the satellite camera and to a central reference camera, and the segmentation application obtains a pseudo depth map from each optical flow. The segmentation application then solves an optimization problem to jointly fuse the individual pseudo depths into a single, pseudo depth map at the reference camera for each video frame, and further uses edge information to refine edges of the pseudo depth map. This fusion-and-refinement step is edge-aware to help guarantee that edges of the pseudo depth map are well-aligned with image silhouettes. Having obtained the pseudo depth map at the reference camera, the segmentation application may interpolate virtual green screen positions for an entire frame based on a user input of control points and corresponding pseudo depth thresholds that define points of the virtual green screen. In one aspect, the segmentation application then computes an initial segmentation based on a thresholding using the virtual green screen positions. Further, the application may refine the initial segmentation by solving a binary labeling problem in a Markov random field to better align the segmentation with image edges and provide temporal coherency for the segmentation.

Figure 1:
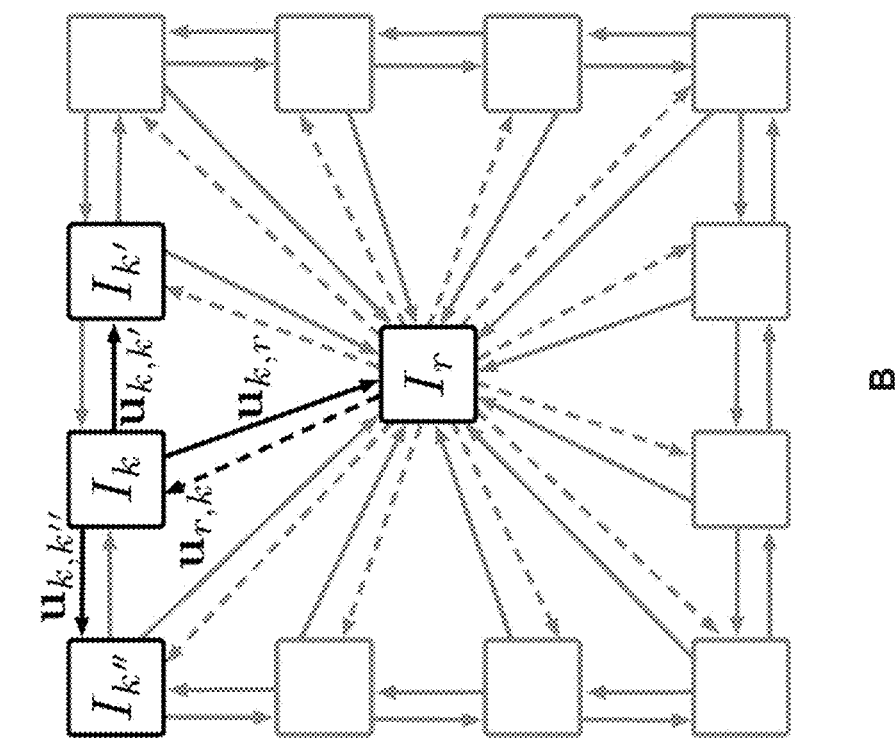
FIG. 1 illustrates the layout of an example camera array, according to an aspect of this disclosure.
Figure 1:
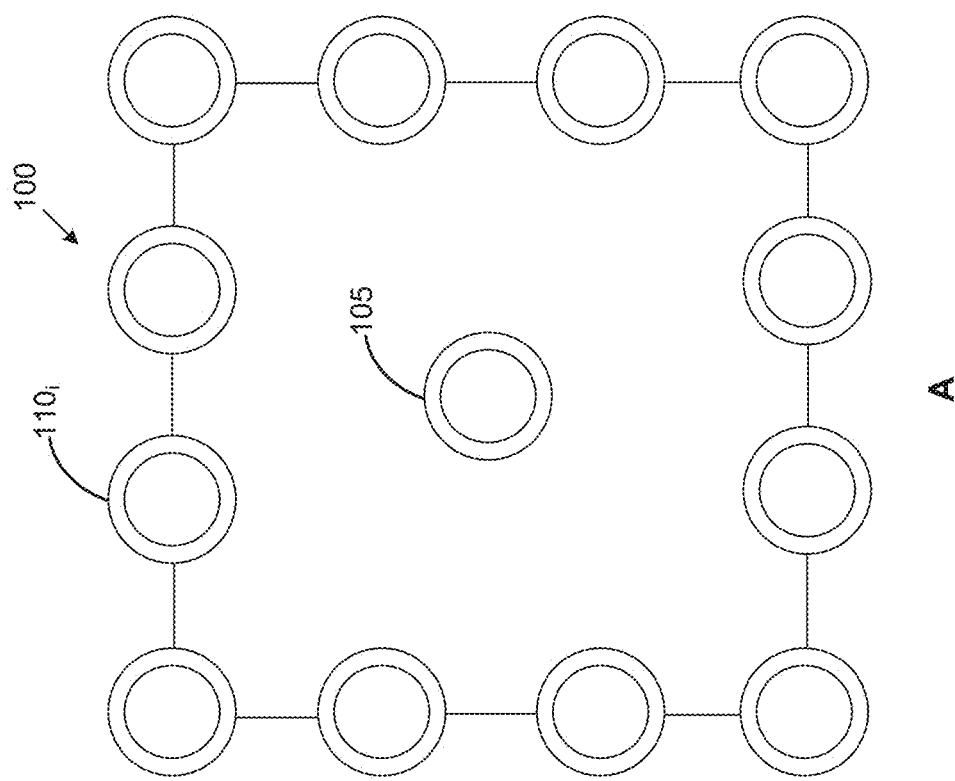

FIG. 1 illustrates the layout of an example camera array 100, according to an aspect of this disclosure. As shown in panel A, the camera array 100 includes a central camera 105 and twelve satellite cameras 110. In one aspect, the central camera 105, also referred to herein as the "reference" camera, may be a digital movie camera used to capture video with desired composition and focus, while the satellite cameras 110 may be additional cameras used to obtain depth information. In such a case, the reference camera 105 may have larger resolution and higher optical quality than the satellite cameras 110. In addition, the reference camera 105 and satellite cameras 110 may be synchronized using a trigger pulse. Although twelve satellite cameras 110 are shown, it should be understood that a different number of satellite cameras may also be used in the camera array.

A segmentation application may compute an initial pseudo depth map for each frame of a video sequence recorded with the camera array 100 based on dense correspondences computed between the satellite cameras 110 and their neighboring cameras, without requiring geometric or photometric camera calibration such as estimating the cameras' focal lengths and relative positions, employing a checkerboard calibration target, and the like. The initial pseudo depth map may further be refined such that edges in the pseudo depth map are aligned with image silhouettes. The refined pseudo depth maps may then be used to define a virtual green screen and segment images into foreground portion(s) closer than the virtual green screen and background portion(s) behind the virtual green screen, as discussed in greater detail below.

In computing the pseudo depth map, the goal is to infer a pseudo depth $d(x) \in [0,1]$ for each pixel $x=(x,y) \in R^2$ of the reference camera image, shown as $I_r(x) \in R^3$ in panel B. In one aspect, the segmentation application obtains the pseudo depth d by combining pseudo depths $d_k$ computed for each satellite camera image, shown as $I_k$. The individual pseudo depths $d_k$ may be inferred from dense correspondences $u_{k,l}$ computed from the satellite camera image $I_k$ to its left and right neighbors $I_{k'}$ and $I_{k''}$, as well as to the reference camera image $I_r$, i.e., $l \in (k', k'', r)$. The correspondences $u_{k,l}$ indicate where each pixel in the satellite camera image $I_k$ moves to in the neighboring images $I_{k'}$ and $I_{k''}$ and the reference camera image $I_r$, with pixels that move more generally being closer to the camera, and vice versa. In panel B, pairwise correspondences between each satellite camera and its neighbors and the reference camera are represented by arrows. In one aspect, the segmentation application may compute the dense correspondences $u_{k,l}(x) \in R^2$ from $I_k$ to $I_l$ in the form of optical flow fields.

Figure 2:
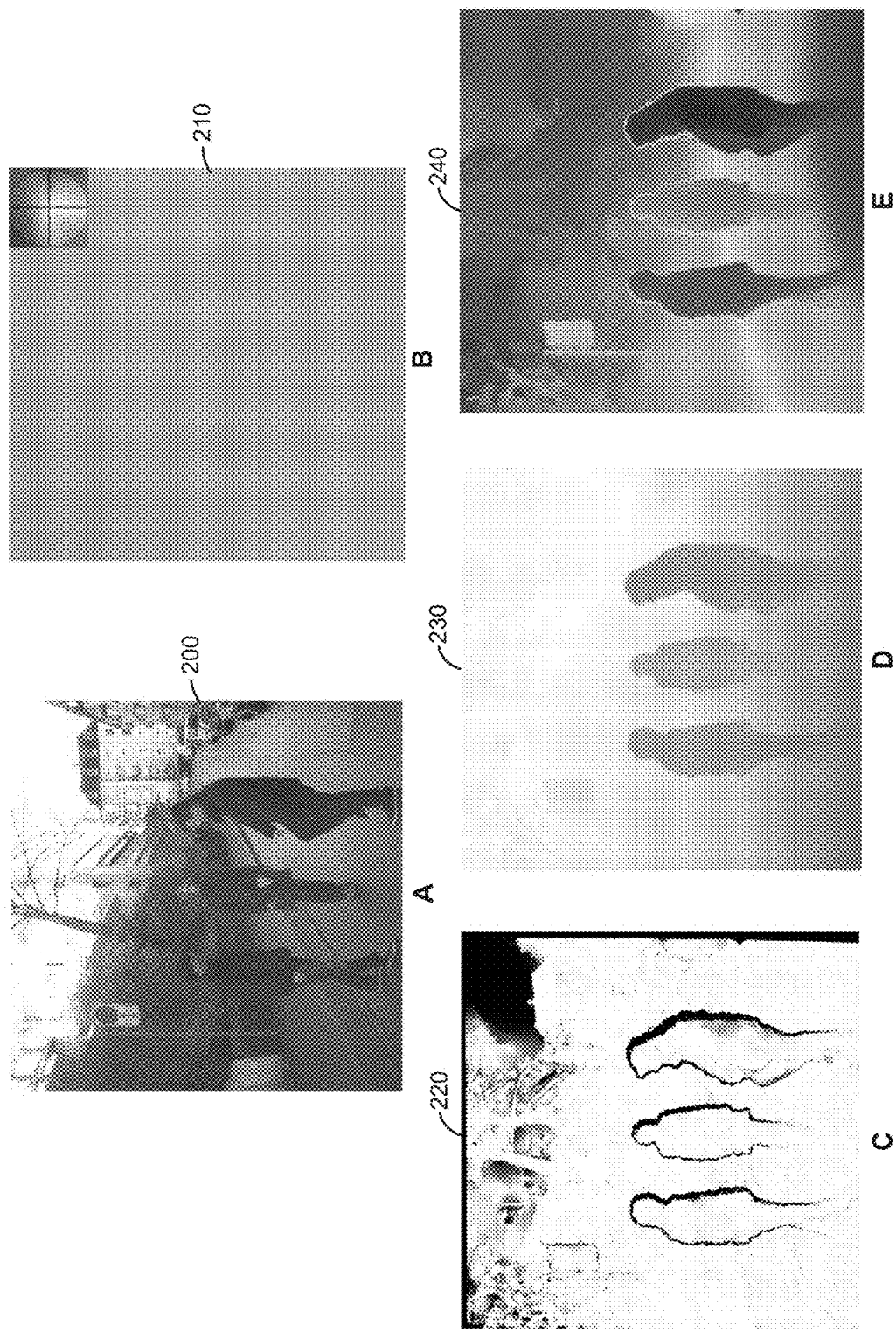
FIG. 2 illustrates an approach for computing pseudo depths based on dense correspondences from an optical flow, according to an aspect of this disclosure.

FIG. 2 illustrates the approach for computing pseudo depths based on dense correspondences from an optical flow, according to an aspect of this disclosure. Panel A shows an example image $I_k$, which as discussed may be an image captured by a satellite camera 1101 of the camera array 100. Panel B shows an optical flow $u_{k,k'}$ computed using the image $I_k$ and its neighbor image $I_{k'}$.

In addition to computing the optical flow fields, the segmentation application may associate a confidence value for each flow vector to allow later processing steps to compensate for less accurate flow estimates, e.g., at occlusions. Panel C shows an example confidence $c_{k,l}$ computed for the flow field 210. In one aspect, the segmentation application may compute the flow confidence based on a forward-backward consistency measure stating that the (forward) flow $u_{k,l}$ should be inverse to its backward counterpart $u_{l,k}$. That is, a round trip following the flow forward and backward again should return to the same place unless something is wrong with the flow such as an occlusion, and flows that do not return to the same place as a result of problems such as occlusions are assigned lower confidence. In one aspect, the segmentation application may use the consistency measure $$f_{k,l}(x) = \|u_{k,l}(x) + u_{l,k}(x + u_{k,l}(x))\|^2, \quad (1)$$

where small values of $f_{k,l}$ indicate consistent flow vectors. The flow confidence may then be defined as $$c_{k,l}(x) = \exp(-f_{k,l}(x)). \quad (2)$$

Having obtained optical flow fields and flow confidence, the segmentation application may compute a pseudo depth map $d_{k,l}$ for each flow field $u_{k,l}$ by analyzing the flow magnitudes, without requiring geometric or photometric camera calibration such as estimating the cameras' focal lengths and relative positions, employing a checkerboard calibration target, and the like. As discussed, pseudo depths are not actual scene depths but do capture the depth ordering of pixels in the scene and provide a strong cue in segmenting the image. In one aspect, the segmentation application first obtains a residual flow field, such as the residual flow field 230 shown in panel D, in which objects at different depths are more easily distinguishable than in the initial optical flow field 210. In such a case, the residual flow field may be obtained by removing a global translation component, that is the main part of motion between neighboring cameras in a dense camera array, such as the camera array 100 discussed above. The global translation component tends to make the flow field 210 "flat", which makes it difficult to compute a pseudo depth from the flow field 210. In one aspect, the segmentation application may remove such a translation component by matching Speeded Up Robust Features (SURF) features from $I_k$ to $I_l$ and fitting a translation $t_{k,l} \in \mathbb{R}^2$ via random sample consensus (RANSAC). It should be understood that other features may be used, such as scale-invariant feature transform (SIFT) or Harris corners features, and simpler fittings than RANSAC may also be used, such as least squares. After removing the global translation component, the motion in the residual flow field $u_{k,l}(x) - t_{k,l}(x)$ is then caused by depth parallax only, making objects at different depths more easily distinguishable and enabling a robust pseudo depth to be computed.

Panel E shows an example of a pseudo depth map 240 computed from the residual flow 230. Pseudo depth can be computed from the residual flow field, as the flow magnitude in a flow field is related to the depth of the corresponding scene points. In particular, pixels closer to the camera and having less depth tend to move more in the flow field than pixels that are farther from the camera. For a perfectly ortho-parallel camera setup, the flow magnitude would be inversely proportional to the depth. However, a perfect alignment of cameras cannot be guaranteed in practice, especially when using less accurate mounts such as ball heads. For a general camera layout that is not perfectly aligned, there may be a plane of zero parallax, i.e., zero flow magnitude, and points having the same distance to this plane but lying on different sides of the plane will have the same flow magnitude but opposite signs. In one aspect, the segmentation application may overcome this ambiguity between flow magnitude and depth by offsetting all (residual) flow vectors by the component-wise minimum of the flow, rendering the resulting flow magnitude inversely proportional to the depth. To robustly compute this offset, the segmentation application may only consider confident flow estimates with $f_{k,l}(x) < 1$. It should be understood that thresholds discussed herein, such as the 1 threshold for confident flow estimates, are given as examples, and other thresholds may be used in other cases. For example, the threshold for confident flow estimates may be adjusted for different scenes. It should further be noted that, to actually compute the zero parallax plane to do a more informed compensation, camera calibration would be required. After offsetting the (residual) flow vector by the component-wise minimum of the flow, the segmentation application may obtain the pseudo depth $d_{k,l}$ by normalizing the offset residual flow magnitude to the range [0,1] (or any other range), where again only the confident flow vectors $f_{k,l}(x) < 1$ may be considered to compute the normalization factor.

Figure 3:
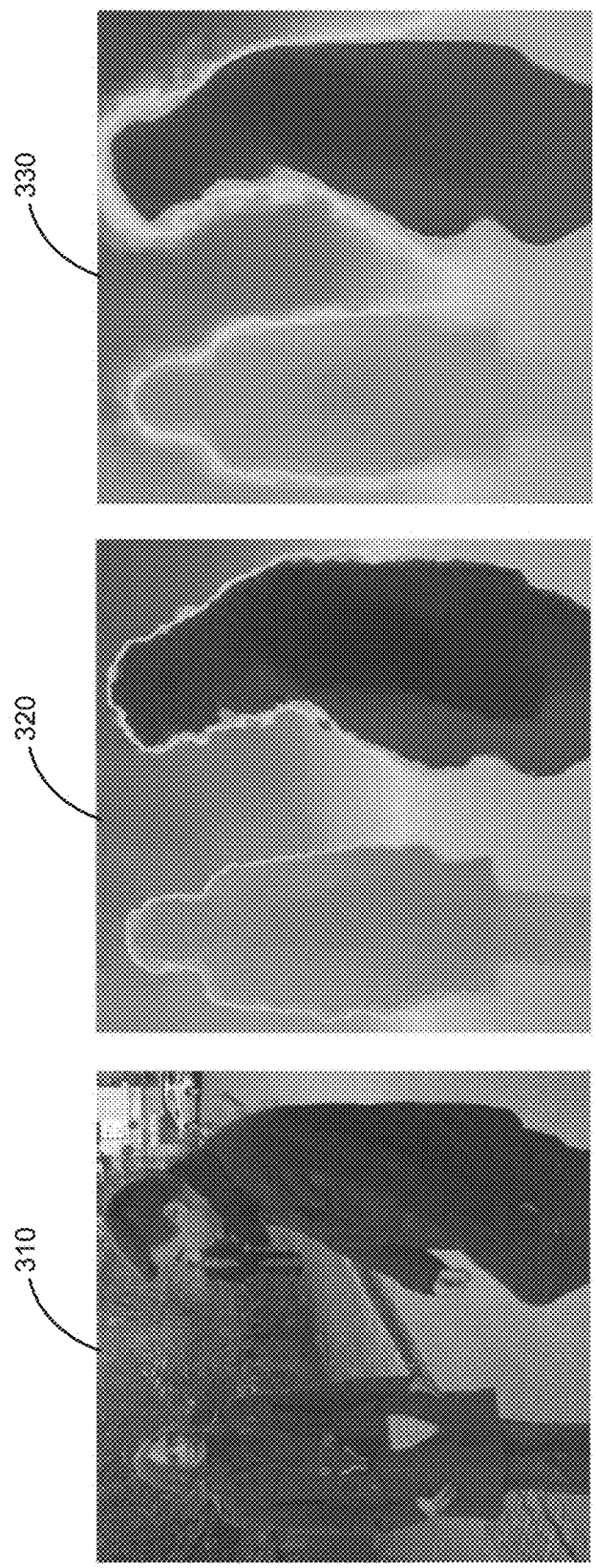
FIG. 3 illustrates fusing of multiple pseudo depths into a single pseudo depth at a reference camera, according to an aspect of this disclosure.

FIG. 3 illustrates fusing of multiple pseudo depths into a single pseudo depth at a reference camera, according to an aspect of this disclosure. As discussed, individual pseudo depths $d_{k,l}$ may initially be obtained for each satellite camera image $I_k$, and the segmentation application may then combine such individual pseudo depths $d_{k,l}$ to compute the pseudo depth d for each pixel of the reference camera image. As discussed in greater detail below, the individual pseudo depth maps are combined by using computed correspondences to warp the pseudo depth maps to the reference camera. That is, for each pixel in the reference camera image, corresponding pixels in the satellite camera images are determined based on the computed correspondences, and the pseudo depths of the corresponding pixels are then taken and combined to obtain the pseudo depth at the reference camera pixel.

In one aspect, the segmentation application may fuse the individual pseudo depths $d_{k,l}$ in two steps to obtain the pseudo depth d at the reference camera. The segmentation application may first compute a fused pseudo depth $d_k$ for each satellite camera image $I_k$ based on the three individual pseudo depths $d_{k,k'}$, $d_{k,k''}$, and $d_{k,r}$, and then the image segmentation application may compute pseudo depth d by fusing all $d_k$ at the central reference camera 105. Both fusion steps may leverage the flow confidence, discussed above, to down-weight the influence of less reliable estimates. That is, estimates with less confidence contribute less to the fused result. In addition, edge information from the camera images may be considered to refine the edges of the resulting pseudo depths to better follow image silhouettes, as the quality around silhouettes is particularly important for segmentation applications.

Prior to fusing pseudo depth maps $d_i$ and $d_j$, (e.g., $d_{k,k'}$ and $d_{k,k''}$), the ranges of their values may need to be aligned to each other. In particular, the different camera configurations used to compute the flows $u_i$ and $u_j$ result in different ranges of flow magnitudes, which in turn result in different offsetting and normalization. As a result, the two pseudo depth maps $d_i$ and $d_j$ may differ by an offset o and a scaling s. By fixating $d_i$, the segmentation application may compensate for this effect by finding the offset o and scaling s that optimally align the values of $d_j$ to those of $d_i$ in the least squares sense:

$$\min_{o,s} \sum_x [d_i(x) - (s \cdot d_j(x) + o)]^2. \quad (3)$$

It should be understood that the offset o shifts the (scaled) mean of $d_j$ to that of $d_i$, and that the scale s equalizes the variances $\sigma_i^2$ and $\sigma_j^2$:

$$o = \mu_i - s \cdot \mu_j, s = \sqrt{\sigma_i^2/\sigma_j^2}. \quad (4)$$

Equation (4) is the solution of equation (3). However, in the fusion process, there are no distinguished pseudo depth maps $d_i$ to keep fixed and fit the other depth maps to, as all $d_j$ may be equally reliable. In one aspect, the segmentation application may instead solve the alignment problem by normalizing all pseudo depth maps such that $\mu_i = 0$ and $\sigma_i = 1$, which yields o=0 and s=1, such that the pseudo depth maps may be considered aligned. Then, a final align step may adjust the orientation. Depending on the orientation of the camera pair used in the flow computation, the offsetting can lead to different gradients in the resulting pseudo depths: in some cases, close points may have a small depth value (flow magnitude) and far ones may have a large depth value, whereas other configurations may yield the opposite result, which after the above normalization leads to positive or negative pseudo depth values. To resolve this ambiguity, one pseudo depth map d may be designated as the reference (any one may be picked) and compared to the other pseudo depth maps $d_j$ by computing the difference of $d_i$ to the unmodified pseudo depth maps (i.e., $|d_i - d_j|$) and also the difference to an inverted version (i.e., $|d_i - (-d_j)|$). If the latter is smaller, the segmentation application may invert $d_j$ before the fusion. Note, to remove the influence of outliers, the segmentation application may only compute the differences for confident pixels.

Having performed the pre-fusion alignment step, the segmentation application then computes fused pseudo depth $d_k$ for each satellite camera image $I_k$ by minimizing the energy $$E(d_k) = \Sigma_x [\Sigma_{l \in \{k',k'',r\}} c_{k,l}(x)(d_k(x) - d_{k,l}(x))^2 + \lambda \Sigma_{y \in N(x)} w_{I_k}(x,y)(d_k(x) - d_k(y))^2]. \quad (5)$$

In one aspect, the segmentation application may use the fast global smoother (FGS) technique to optimize the energy in equation (5). The first summand in equation (5) is a data term that models the confidence-weighted fit of $d_k$ to the three input pseudo depths $d_{k,k'}$, $d_{k,k''}$, and $d_{k,r}$. This term helps ensure that the fused pseudo depth $d_k$ is close to the previously computed pseudo depths $d_{k,k'}$, $d_{k,k''}$, and $d_{k,r}$. The second summand is a smoothness term that enforces a smooth result by penalizing large differences of the solution at pixel x to its four neighboring pixels in N(x). In one aspect, the segmentation application may use the image-based weight $$w_{I_k}(x,y) = \exp(-\|I_k(x) - I_k(y)\|^2/\sigma) \quad (6)$$

to obtain a piecewise smooth solution with discontinuities that are well aligned to the image edges of $I_k$. In a particular configuration, $\sigma = 10^{-3}$ and $\lambda = 10^7$ may be used in equations (5) and (6).

In one aspect, the segmentation application may also compute a fused confidence $c_k$ by minimizing the same energy as in equation (5) with the data term replaced by $\Sigma_l(c_k(x) - c_{k,l}(x))^2$. Such a confidence may then be used in a fusion at the reference image, which involves fusing the pseudo depths $d_k$ from the satellite cameras 110 at the reference camera 105 to compute the desired pseudo depth d. It should be understood that, due to the different camera positions, the pseudo depths $d_k$ are not aligned with the reference camera image $I_r$, and the segmentation application may first align these images by warping every pseudo depth $d_k$ to the viewpoint of the reference camera. Using the flow fields $u_{r,k}$, the segmentation application may compute the warped pseudo depths $d_k^w(x) = d_k(x + u_{r,k}(x))$ as well as the warped confidences $c_k^w$. The segmentation application may further fuse the warped pseudo depths using the same approach as that for the satellite cameras 110, discussed above, with the index 1 in equation (5) changed to iterate over all of the satellite cameras 110. In a particular configuration, $\lambda=10^2$ and $\sigma=10^{-2}$ may be used in equations (5) and (6) to have a less restricted and less strong smoothing. An example of the resulting fused pseudo depth 330 is shown in panel C of FIG. 3. Such a fused pseudo depth 330 is better edge-aligned than the individual pseudo depths for the satellite images, such as the pseudo depth 320 shown in panel B.

Figure 4:
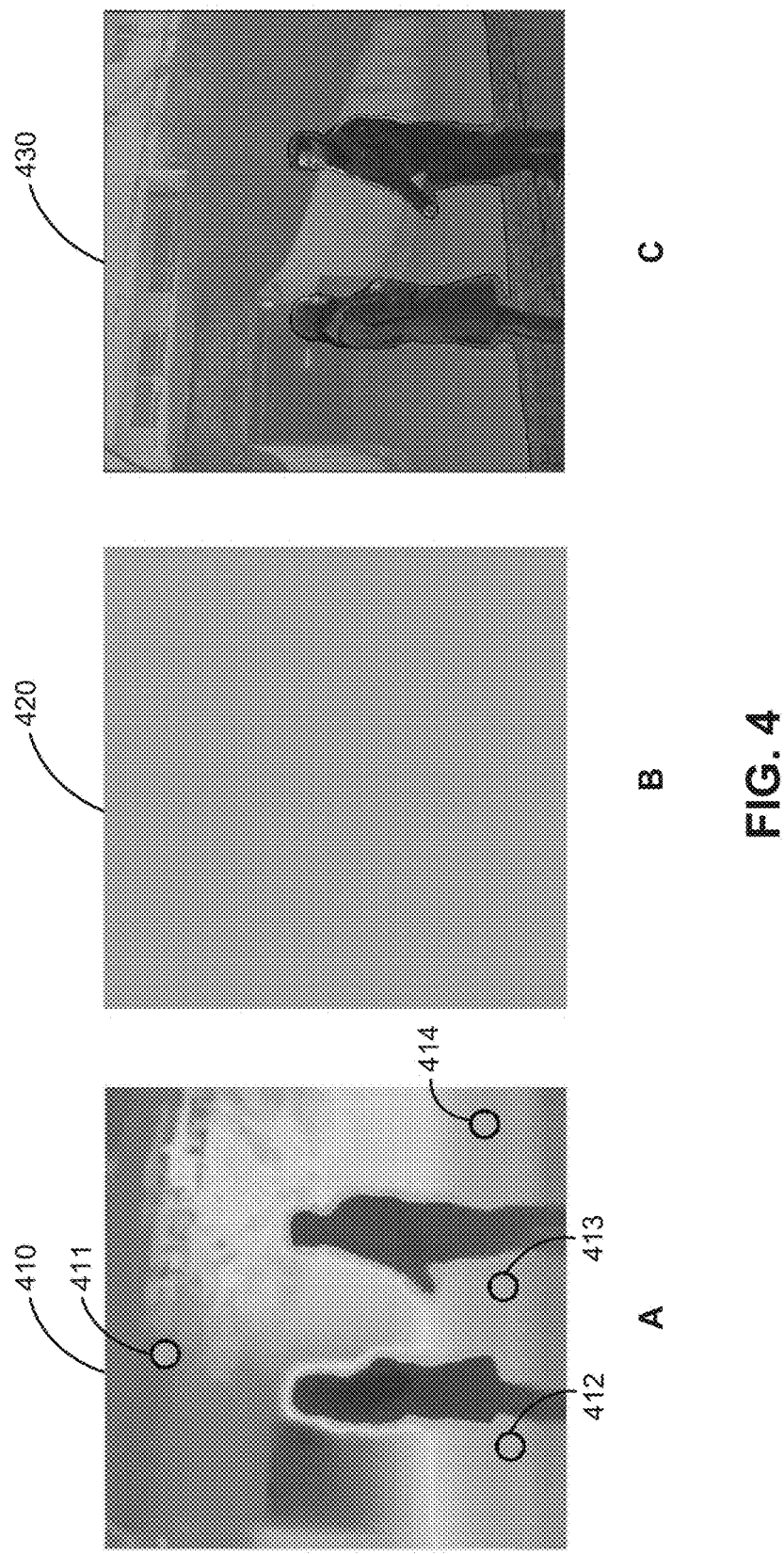
FIG. 4 illustrates an approach for interpolating virtual green screen positions for the one or more images based on user-defined control points, according to an aspect of this disclosure.

FIG. 4 illustrates an approach for interpolating virtual green screen positions for the one or more images based on user-defined control points, according to an aspect of this disclosure. Subsequent to computing pseudo depths, the segmentation application permits the user to interactively manipulate the position and shape of a virtual green screen based on control points, which may be added via a user interface and define points of the virtual green screen. Examples of control points 411, 412, 413, and 414 added to a pseudo depth map 410 are shown in panel A. In one aspect, the user may define depth threshold values $\tau_i \in [0,1]$ at each of the control points $x_i$ (i=1, ..., N). For example, the user may click with a mouse to add control points and scroll a scroll wheel to adjust the depth of those control points in pseudo-depth space. The segmentation application may then apply interpolation to obtain the green screen position $\Gamma(x)$ for every pixel x of the image. That is, the segmentation application interpolates the user input virtual green screen points to create a smooth manifold in pseudo-depth space that defines the virtual green screen. User adjustments to the control points and associated depth thresholds may also be propagated to other points so that those points move as well.

In one aspect, thin plate spline (TPS) interpolation may be used to obtain the virtual green screen, as it has a physical analogy with the bending of an actual physical green screen and therefore provides a well-behaved and intuitive behavior when placing and modifying control points. In such a case, the TPS interpolant may be computed by discretizing the thin plate bending energy $\int_x \Gamma_{xx}^2(x) + 2\Gamma_{xy}^2(x) + \Gamma_{yy}^2(x) dx$ using finite differences on the image grid, and finding the minimum energy interpolant by solving a Bi-Laplacian linear system for all unknown pixel values $\Gamma(x)$. Where there are only a small number of Dirichlet constraints, the TPS interpolant may be computed more efficiently using radial basis functions (RBFs). Using RBFs, the TPS interpolant has the form $$\Gamma(x) = \Sigma_{i=1}^N \omega_i \phi(\|x-x_i\|) + \pi(x), \qquad (7)$$

with $\pi(x) = ax + by + c$ being a linear polynomial and $\phi(r) = r^2 \log(r)$ being the TPS kernel. The unknown coefficients $\omega_i$ of the RBFs and (a, b, c) of the polynomial $\pi(x)$ may be found by solving a small linear system of size (N+3)×(N+3), such that $\Gamma(x_i) = \tau_i$, i=1, ..., N.

Given the computed green screen position $\Gamma(x)$, the segmentation application may compute an initial preview segmentation $\Sigma(x)$ in real-time by thresholding: $\Sigma(x) = (d(x) \leq \Gamma(x))$. An example of a green screen 420 and the initial segmentation 430 are shown in panels B and C, respectively, of FIG. 4. As discussed in greater detail below, the initial segmentation may be refined to produce a more accurate final segmentation from the green screen positions. In addition, after defining the virtual green screen position $\Gamma^0$ for an initial frame (e.g., at time t=0), the segmentation application may further track the virtual green screen to the next frames in the video. Such tracking compensates for object motion and camera motion, and such tracking is needed as objects may move from frame to frame and the pseudo depth is computed and normalized per-frame and thus will change due to camera motion. To compute the updated green screen position $\Gamma^t$ for a next frame, the segmentation application may warp the control points from time t−1 using the temporal optical flow $u^{t-1,t}$, yielding the updated positions $x_i^t = x_i^{t-1} + u^{t-1,t}(x_i^{t-1})$. The segmentation application may also update $\tau_i$ to reflect the potential change in pseudo depth via $\tau_i^t = \tau_i^{t-1} + (d^t(x_i^t) - d^{t-1}(x_i^{t-1}))$. From the updated $x_i^t$ and $\tau_i^t$, the updated green screen position $\Gamma^t$ may be computed by again performing TPS interpolation.

Depending on the control point placement and the scene motion, control points may become occluded and tracking may fail, e.g., when a person walks in front of a control point placed in the background. In one aspect, the segmentation application may detect occlusions based on low confidence flow vectors with c(x)<0.9, where the flow confidence c is computed as in equation (2). Once again, it should be understood that the 0.9 threshold is given as an example, and other thresholds may be used in other cases, such as for different scenes. When such occlusions are detected, the segmentation application may prompt the user to re-position the occluded control point and then continue tracking. Although this may lead to a slight temporal inconsistency of the green screen at these frames, experience has shown that the final segmentation refinement, discussed below, is usually able to account for the inconsistency. In cases where the control point leaves the image domain, the segmentation application may fix the control point at the last valid position in order to avoid abrupt changes in the green screen position. The user may also be permitted to remove or re-position the control point to a position where it can be further tracked.

Figure 5:
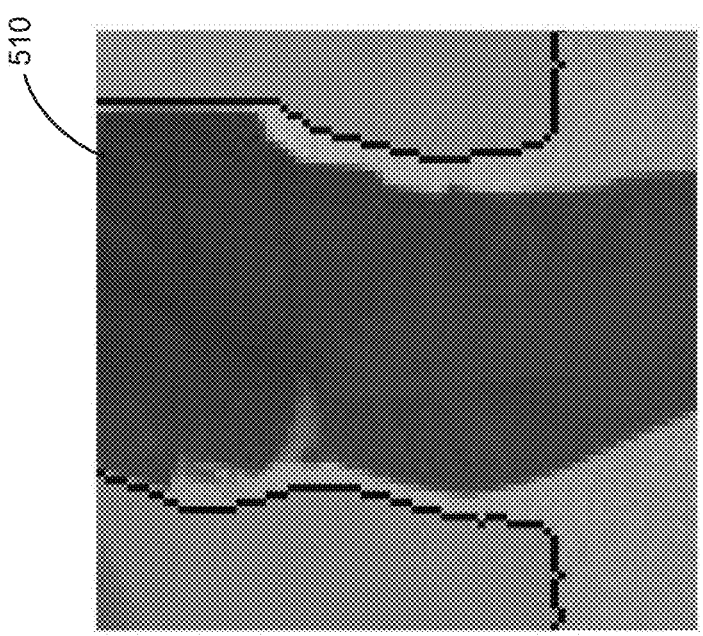
FIG. 5 illustrates an approach for refining image segmentation, according to an aspect of this disclosure.
Figure 5:
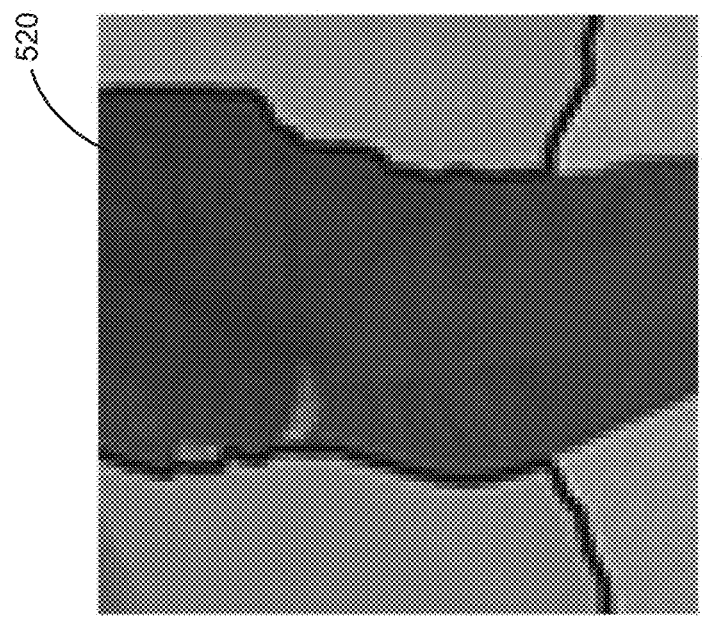

FIG. 5 illustrates an approach for refining image segmentation, according to an aspect of this disclosure. As shown in panel A, the starting point for the final segmentation is an initial segmentation 510 obtained via the interpolation discussed above with respect to FIG. 4. In one aspect, the segmentation application may refine such an initial segmentation 510 by solving a binary labeling problem in a Markov random field (MRF), which snaps the segmentation to image boundaries. That is, after the green screen positions $\Gamma^t$ have been defined for every frame t, the segmentation application computes a final high-quality image segmentation that is better aligned with the images edges and also temporally consistent. Essentially, the final segmentation should be smooth in space and time. Panel B shows an example of the resulting final segmentation 520.

In one aspect, the segmentation application may find the final segmentation $\Sigma^t(x) \in (0,1)$ by solving the binary labeling problem in a MRF that is defined as $$E(\Sigma^t) = \Sigma x_t [D(\Sigma^t; d^t, \Gamma^t) + \lambda_S S(\Sigma^t) + \lambda_T T(\Sigma^t; \Sigma^{t-1})]. \qquad (8)$$

Equation (6) may be efficiently minimized with, e.g., graph cuts using alpha expansion, and the relative weights $\lambda_S = 50$ and $\lambda_T = 10$ may be used in one particular configuration. The weights permit the user to specify how much the smoothness S and temporal consistency terms T are enforced. The data term $D(\Sigma^t; d^t, \Gamma^t) = -\log(P(\Sigma^t|d^t, \Gamma^t))$ enforces that the final term segmentation is faithful to the initial segmentation, and may be computed from the foreground probability:

$$P(\Sigma^t = 1|d^t, \Gamma^t) = \psi(\Gamma^t(x) - d^t(x)), \qquad (9)$$

where the parametrized sigmoid function $\psi(r) = (1 + \exp(-\eta r))^{-1}$ with $\eta = 100$ may be applied to the difference of the depth ordering and the virtual green screen position to obtain a continuous probability function. The background probability may then be computed as $P(\Sigma^t = 0|d^t, \Gamma^t) = 1 - P(\Sigma^t = 1|d^t, \Gamma^t)$.

In one aspect, the smoothness term $$S(\Sigma^t) = \Sigma_{y \in N_8(x)} w_{I_r}(x,y)(\Sigma^t(x) - \Sigma^t(y))^2 \qquad (10)$$

may be used to penalize differences in the labeling of neighboring pixels, where $N_8(x)$ denotes the 8 neighboring pixels of x. In such a case, the segmentation application may use an image-based weighting function $w_{I_r}$ defined in accordance with equation (6) to snap the resulting segmentation to image edges in the reference image. The intuition behind this is that neighboring pixels should have similar segmentation, i.e., the segmentation should be spatially smooth, except at edges which are handled using the weighting function $w_{I_r}$.

For frames t>0, the temporal consistency term $T(\Sigma^t; \Sigma^{t-1})$ may also be added to prevent flickering of results. The intuition behind this is that the segmentation at time t should not be arbitrarily different from the segmentation at t−1. In one aspect, the temporal consistency term may be defined as $$T(\Sigma^t; \Sigma_{t-1}) = c_{t,t-1}(x)(\Sigma^t(x) - \Sigma^{t-1}(x + u_{t,t-1}(x)))^2, \qquad (11)$$

which penalizes differences of the current segmentation to the temporally warped result from frame t−1. This term may further be weighted by the confidence $c_{t,t-1}$ of the temporal flow $u_{t,t-1}$ computed from its forward-backward consistency as $c_{t,t-1}(x) = \exp(-f_{t,t-1}(x))$. Adding this term helps remove flickering of segmentations between frames.

Figure 6:
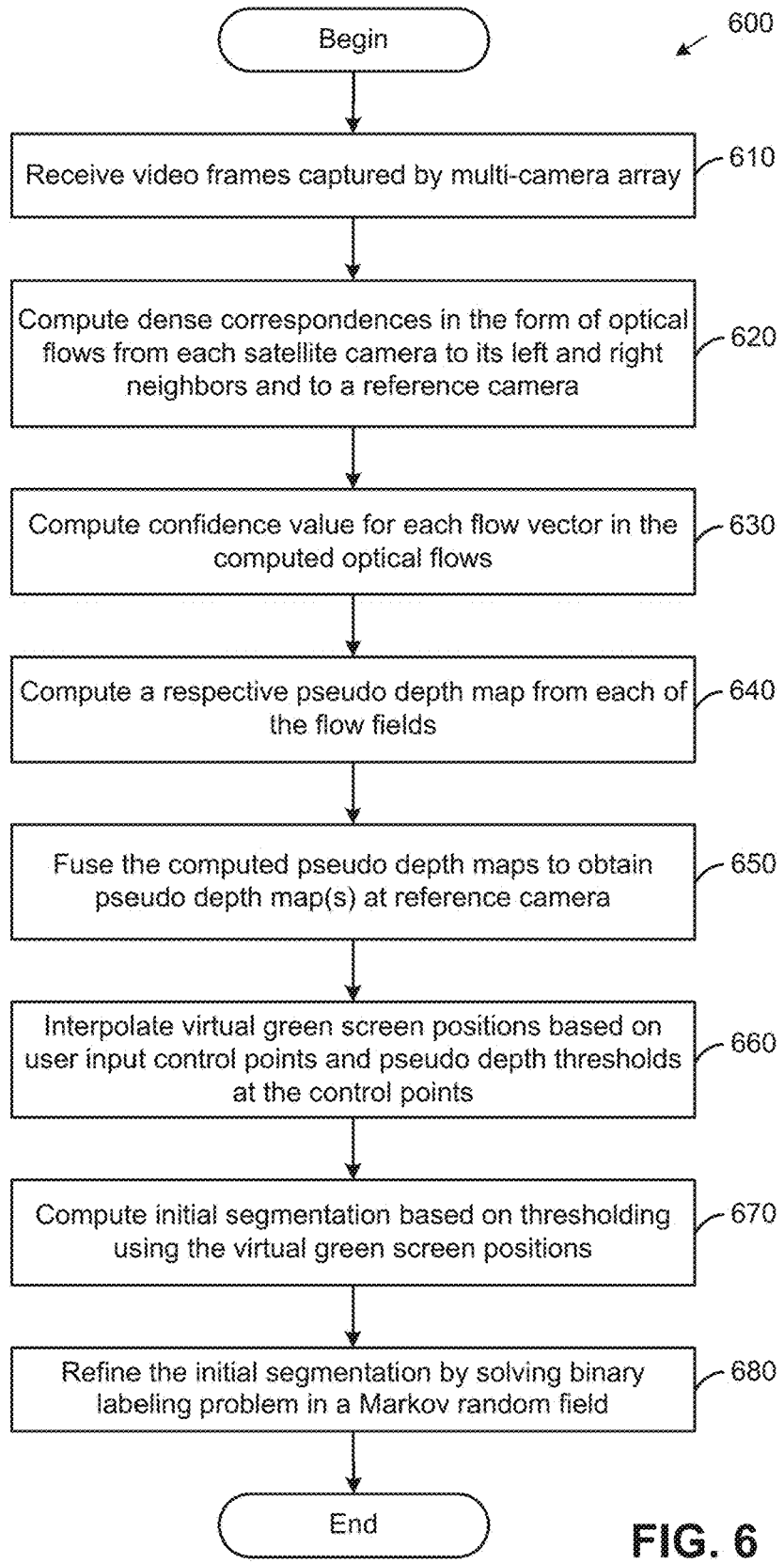
FIG. 6 illustrates a method for segmenting video from an uncalibrated camera array, according to an aspect of this disclosure.

FIG. 6 illustrates a method 600 for segmenting video from an uncalibrated camera array, according to an aspect of this disclosure. As shown, the method 600 begins at step 610, where a segmentation application receives video frames captured by a multi-camera array, such as the camera array 100 discussed above.

At step 620, the segmentation application computes dense correspondences in the form of optical flows from each satellite camera $110_i$ to its left and right neighbors and to the reference camera 105. Any feasible flow method may be used to obtain the optical flows, and many existing flow methods are both robust to photometric changes and preserve edges to capture boundaries between scene objects.

At step 630, the segmentation application computes a confidence value for each flow vector in the optical flows computed at step 620. As discussed, doing so permits later processing steps to compensate for less accurate flow vector estimates, such as estimates made at occlusions. In one aspect, the segmentation application may compute the confidence based on a forward-backward consistency measure specifying that the forward flow should be inverse to its backward counterpart, such as the consistency measure given by equation (1) that leads to the flow confidence given by equation (2).

At step 640, the segmentation application computes a respective pseudo depth map from each of the flow fields obtained at step 620. As discussed, the fact that flow magnitude is related to the depth of corresponding scene points may be used to obtain pseudo depths. In one aspect, the segmentation application may compute the pseudo depth maps by removing a global translational component of motion, in which pixels are simply shifted, from the flow fields (by, e.g., matching SURF features and fitting a translation via RANSAC) to obtain residual flows; offsetting, for each of the flows, the residual flow vectors by component-wise minima of the flow so that the resulting flow magnitude is inversely proportional to depth; and normalizing, for each of the flows, the offset residual flow magnitude to the range [0,1], with only confident flow vectors being used to compute the normalization factor. Further, the segmentation application may compute the pseudo depth maps in parallel for each video frame.

At step 650, the segmentation application fuses the pseudo depth maps computed at step 640 to obtain pseudo depth map(s) at the reference camera. Like the computation of pseudo depth maps at step 640, the fusion of pseudo depth maps may be performed in parallel for each video frame. As discussed, the pseudo depth maps may be fused by using computed correspondences to warp the pseudo depth maps to the reference camera. In one aspect, the segmentation application may solve an optimization problem to jointly fuse the individual pseudo depths into a single, edge-aligned pseudo depth map at the reference camera, and the segmentation application may perform such fusing in two steps: (1) computing a fused pseudo depth map for each satellite camera image based on the three individual pseudo depth maps obtained using the dense correspondences from the satellite camera image to the reference image and to the images from cameras to the left and right of the satellite camera; and (2) fusing all of the fused pseudo depth maps computed in the first step at the reference camera. In both fusion steps, the segmentation application may down-weight the influence of less reliable estimates based on computed confidences, as well as use edge information from the camera images to refine edges of the fused pseudo depth maps. In one aspect, the segmentation application may also perform pre-fusion alignment to compensate for the offset and scaling differences between pseudo depth maps, as discussed above.

At step 660, the segmentation application interpolates virtual green screen positions based on user input control points and pseudo depth thresholds at the control points. The user may input the control points and pseudo depth thresholds by, e.g., clicking with a mouse to add the control points and scrolling a scroll wheel to adjust the depth of those control points in pseudo-depth space. In one aspect, the segmentation application may apply thin plate spline interpolation to obtain the virtual green screen position for every image pixel from the user-input depth threshold values at the control points. In addition, after the virtual green position for an initial frame of a video is obtained, the segmentation application may further track these positions to the next frames in the video so as to compensate for object motion and camera motion. In one aspect, the segmentation application may warp the control points defined by the user in the first frame, using the optical flow, to get updated positions of the control points in the next frames. The same interpolation may then be applied again to obtain the virtual green screen positions in the next frames based on the updated positions of the control points in those frames.

As discussed, control points may also become occluded, and the segmentation application may detect such occlusions based on low confidence flow vectors and prompt the user to re-position the occluded control points before continuing to tracking virtual green screen positions. In addition, if a control point leaves the image domain, the segmentation application may fix the control point at the last valid position, and the user may be permitted to remove or re-position the control point to another position where it can be further tracked.

At step 670, the segmentation application computes an initial segmentation based on a thresholding using the virtual green screen positions. For example, pixels of frames having pseudo depth less than or equal to the virtual green screen positions for those frames may be kept as the segmentation result, while pixels having pseudo depth greater than the green screen positions may be discarded. In one aspect, the initial segmentation may be shown to the user, who may then modify the input control points and pseudo depth thresholds at the control points until a desired virtual green screen position and initial segmentation are achieved.

At step 680, the segmentation application refines the initial segmentation computed at step 670 by solving a binary labeling problem in a Markov random field. As discussed, doing so permits the segmentation to be better aligned with the image edges and temporally coherent. In one aspect, the Markov random field may be defined as in equation (8), with a data term computed based on the foreground probability given in equation (9) and a smoothness such as that in equation (10) that penalizes differences in labeling of neighboring pixels. In addition, a temporal consistency term such as that in equation (11) may be added from frames after the initial frame so as to prevent flickering.

The refined segmentation of the video frames may be used in any feasible manner, such as masking undesirable scene parts, compositing of multiple shots, and adding computer graphics (CG) elements and visual effects. The processes for such masking of undesirable parts, compositing of multiple shots, adding of CG and visual effects, etc. may be similar to those used for videos captured with traditional chroma keying and physical green screens. In addition, the resulting video may be displayed to a user via a display device.

Figure 7:
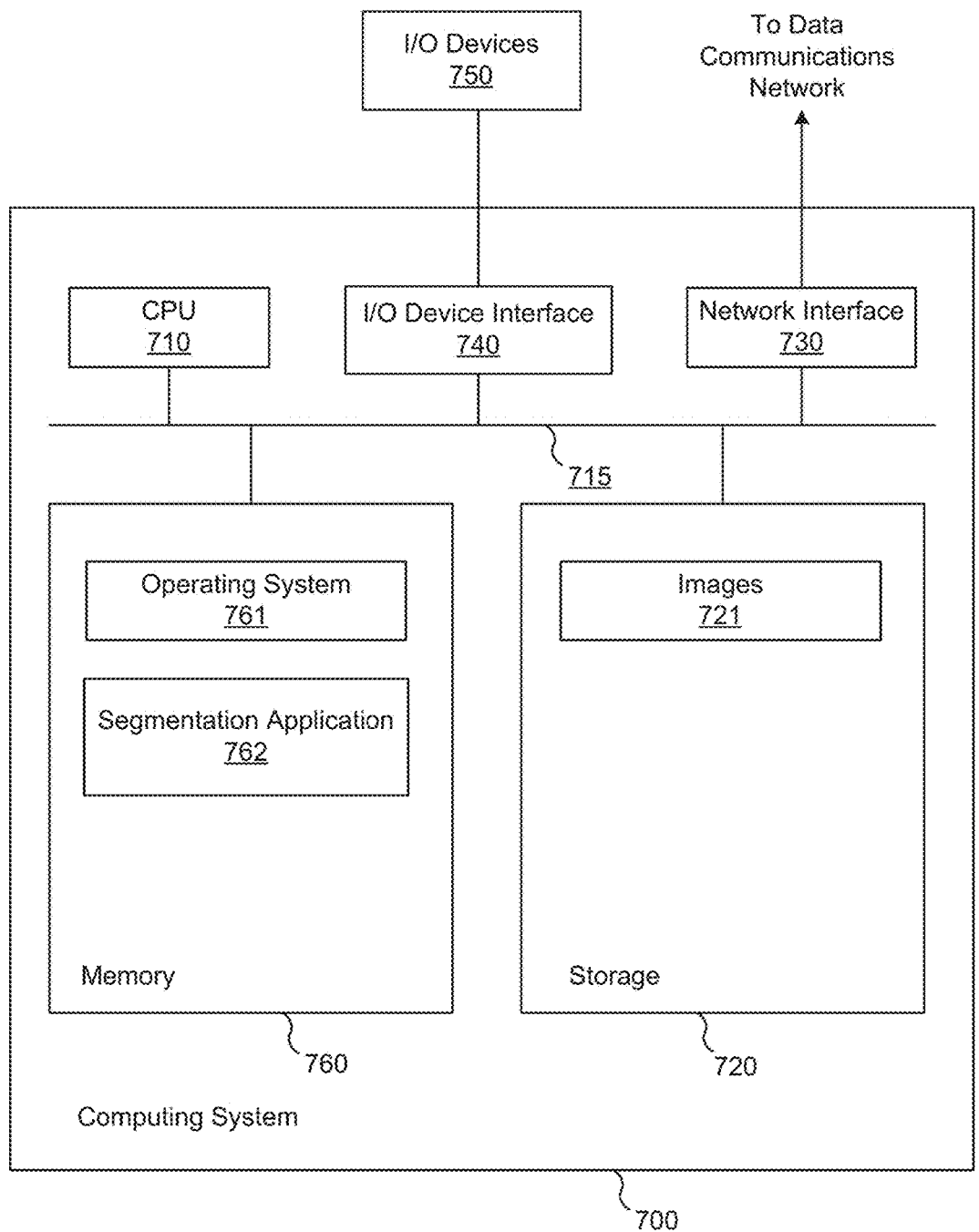
FIG. 7 illustrates a computer system in which an aspect of this disclosure may be implemented.

FIG. 7 illustrates a computer system 700 in which an aspect of this disclosure may be implemented. As shown, the system 700 includes, without limitation, a central processing unit (CPU) 710, a network interface 730, an interconnect 715, a memory 760 and storage 720. The system 700 may also include an I/O device interface 740 connecting I/O devices 750 (e.g., keyboard, display and mouse devices) to the system 700.

The CPU 710 retrieves and executes programming instructions stored in the memory 760. Similarly, the CPU 710 stores and retrieves application data residing in the memory 760. The interconnect 715 facilitates transmission, such as of programming instructions and application data, between the CPU 710, I/O device interface 740, storage 720, network interface 730, and memory 760. CPU 710 is representative of one or more of a single CPU, multiple CPUs, a single CPU having multiple processing cores, one or more graphics processing units (GPUs), and the like. And the memory 760 is generally included to be representative of a random access memory. The storage 720 may be a disk drive storage device. Although shown as a single unit, the storage 720 may be a combination of fixed or removable storage devices, such as fixed disc drives, flash drives, removable memory cards or optical storage, network attached storage (NAS), or a storage area-network (SAN). Further, system 700 is included to be representative of a physical computing system as well as virtual machine instances hosted on a set of underlying physical computing systems. Further still, although shown as a single computing system, one of ordinary skill in the art will recognized that the components of the system 700 shown in FIG. 7 may be distributed across multiple computing systems connected by a data communications network.

As shown, the memory 760 includes an operating system 761 and a segmentation application 762. Illustratively, the operating system 761 may include Linux® or Microsoft's Windows®. The segmentation application 762 is configured to compute virtual green screen positions and segment images based on the virtual green screen positions. In one aspect, the segmentation application 762 may be configured to receive video frames captured by a multi-camera array, computes dense correspondences in the form of optical flows from each satellite camera of the camera array to its left and right neighbors and to a reference camera, compute a confidence value for each flow vector in the optical flows, compute a pseudo depth map from each of the flow fields, fuse the pseudo depth maps to obtain a pseudo depth map at the reference camera, interpolate virtual green screen positions based on user input control points and pseudo depth thresholds at the control points, compute an initial segmentation based on a thresholding using the virtual green screen positions, and refine the initial segmentation by solving a binary labeling problem in a Markov random field, as discussed above with respect to FIG. 6.

Although discussed herein primarily with respect to video frames, techniques disclosed herein may also be used to segment individual images that are not part of video sequences. Further, image segmentation, including the interpolation of virtual green screen positions based on user input control points and depth thresholds, is discussed herein with respect to pseudo depth maps. However, similar image segmentation techniques may also be used to segment images based on traditional depth maps.

Advantageously, techniques disclosed herein provide an approach for obtaining pseudo depth maps from images captured with an uncalibrated camera array and using the pseudo depth maps to compute virtual green screen positions and segment video frames. The segmentation itself may then be used to mask undesirable scene parts, composite multiple shots, and add computer graphics (CG) elements and visual effects, among other things. An intuitive user interface is provided that permits a user to define the virtual green screen by simply inputting control points and corresponding pseudo depth thresholds that are then interpolated to produce the virtual green screen. In contrast to actual 3D depth reconstruction techniques, techniques disclosed herein do not require typically cumbersome calibration procedures and may also be robust to issues such as optical image distortions, non-rigid camera array mounts, and deterioration of calibration quality due to temperature variation and other environmental factors.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method for image segmentation, comprising:
   receiving images captured by cameras in a camera array;
   determining optical flow fields between pairs of the images captured simultaneously by two or more cameras in the camera array;
   computing one or more pseudo depth maps from the optical flow fields, wherein pseudo depths in each pseudo depth map of the one or more pseudo depth maps indicate relative depths of pixels with respect to other pixels in the pseudo depth map but not actual depth measurements, and wherein at least one of the one or more pseudo depth maps is computed by performing steps including:
      removing from an associated one of the optical flow fields a global translational component of motion, thereby producing a residual flow field,
      offsetting the residual flow field by a component-wise minimum of the residual flow field, and
      normalizing a magnitude of the offset residual flow field to a range; and
   segmenting one or more of the images based, at least in part, on one or more of the computed pseudo depth maps.

2. The method of claim 1, wherein computing the one or more pseudo depth maps includes:
   computing initial pseudo depth maps for each satellite camera of the camera array based, at least in part, on optical flow fields to neighboring cameras and to a central camera of the camera array; and
   fusing the initial pseudo depth maps to obtain one or more pseudo depth maps at the central camera.

3. The method of claim 2, wherein fusing the initial pseudo depth maps includes:
   performing pre-fusion alignment to compensate for offset and scaling differences between the initial pseudo depth maps;
   computing a fused pseudo depth map for each satellite camera image by solving an optimization problem to fuse initial pseudo depth maps obtained based, at least in part, on optical flow fields from the satellite camera image to a central camera image and to images from neighboring cameras of the satellite camera; and
   fusing the fused pseudo depth maps for the satellite camera images at the central camera by solving the optimization problem.

4. The method of claim 3, wherein, in computing the fused pseudo depth maps and fusing the fused pseudo depth maps:
   influence of less reliable estimates is downweighted based, at least in part, on computed confidences; and
   edge information from the images captured by the camera array are used to refine edges of the fused pseudo depth maps and the fusion of the fused pseudo depth maps.

5. The method of claim 1, further comprising:
   computing a confidence value for each flow vector in the optical flow fields, wherein the confidence value for each flow vector is used in at least the computing of the one or more pseudo depth maps and the segmentation of the one or more of the images.

6. The method of claim 5, wherein the confidence value for each flow vector is computed based, at least in part, on a forward-backward consistency measure specifying that a forward flow should be inverse to a backward counterpart of the forward flow.

7. The method of claim 1, wherein segmenting the one or more of the images includes:
   receiving user input of one or more control points and pseudo depth thresholds at the control points;
   determining virtual green screen positions for the one or more images based, at least in part, on interpolation of the user input; and
   segmenting the one or more of the images based, at least in part, on thresholding using the virtual green screen positions for the one or more images.

8. The method of claim 7, further comprising, refining each segmentation of the one or more of the images by solving a binary labeling problem in a Markov random field.

9. The method of claim 8, wherein the Markov random field includes one or more of a data term computed based, at least in part, on a foreground probability, a smoothness term that penalizes differences in labeling of neighboring pixels, and a temporal consistency term that penalizes differences of the segmentation from a temporally warped segmentation from a prior frame.

10. A non-transitory computer-readable storage medium storing a program, which, when executed by a processor performs operations for image segmentation, the operations comprising:
receiving images captured by cameras in a camera array;
determining optical flow fields between pairs of the images captured simultaneously by two or more cameras in the camera array;
computing one or more pseudo depth maps from the optical flow fields, wherein pseudo depths in each pseudo depth map of the one or more pseudo depth maps indicate relative depths of pixels with respect to other pixels in the pseudo depth map but not actual depth measurements, and wherein at least one of the one or more pseudo depth maps is computed by performing steps including:
removing from an associated one of the optical flow fields a global translational component of motion, thereby producing a residual flow field,
offsetting the residual flow field by a component-wise minimum of the residual flow field, and
normalizing a magnitude of the offset residual flow field to a range; and
segmenting one or more of the images based, at least in part, on one or more of the computed pseudo depth maps.

11. The computer-readable storage medium of claim 10, wherein computing the one or more pseudo depth maps includes:
computing initial pseudo depth maps for each satellite camera of the camera array based, at least in part, on optical flow fields to neighboring cameras and to a central camera of the camera array; and
fusing the initial pseudo depth maps to obtain one or more pseudo depth maps at the central camera.

12. The computer-readable storage medium of claim 11, wherein fusing the initial pseudo depth maps includes:
performing pre-fusion alignment to compensate for offset and scaling differences between the initial pseudo depth maps;
computing a fused pseudo depth map for each satellite camera image by solving an optimization problem to fuse initial pseudo depth maps obtained based, at least in part, on optical flow fields from the satellite camera image to a central camera image and to images from neighboring cameras of the satellite camera; and
fusing the fused pseudo depth maps for the satellite camera images at the central camera by solving the optimization problem.

13. The computer-readable storage medium of claim 12, wherein, in computing the fused pseudo depth maps and fusing the fused pseudo depth maps:
influence of less reliable estimates is downweighted based, at least in part, on computed confidences; and
edge information from the images captured by the camera array are used to refine edges of the fused pseudo depth maps and the fusion of the fused pseudo depth maps.

14. The computer-readable storage medium of claim 10, the operations further comprising:
computing a confidence value for each flow vector in the optical flow fields, wherein the confidence value for each flow vector is used in at least the computing of the one or more pseudo depth maps and the segmentation of the one or more of the images.

15. The computer-readable storage medium of claim 14, wherein the confidence value for each flow vector is computed based, at least in part, on a forward-backward consistency measure specifying that a forward flow should be inverse to a backward counterpart of the forward flow.

16. The computer-readable storage medium of claim 10, wherein segmenting the one or more of the images includes:
receiving user input of one or more control points and pseudo depth thresholds at the control points;
determining virtual green screen positions for the one or more images based, at least in part, on interpolation of the user input; and
segmenting the one or more of the images based, at least in part, on thresholding using the virtual green screen positions for the one or more images.

17. The computer-readable storage medium of claim 16, the operations further comprising, refining each segmentation of the one or more of the images by solving a binary labeling problem in a Markov random field.

18. A system, comprising:
a processor; and
a memory, wherein the memory includes a program configured to perform operations for image segmentation, the operations comprising:
receiving images captured by cameras in a camera array,
determining optical flow fields between pairs of the images captured simultaneously by two or more cameras in the camera array,
computing one or more pseudo depth maps from the optical flow fields, wherein pseudo depths in each pseudo depth map of the one or more pseudo depth maps indicate relative depths of pixels with respect to other pixels in the pseudo depth map but not actual depth measurements, and wherein at least one of the one or more pseudo depth maps is computed by performing steps including:
removing from an associated one of the optical flow fields a global translational component of motion, thereby producing a residual flow field;
offsetting the residual flow field by a component-wise minimum of the residual flow field; and
normalizing a magnitude of the offset residual flow field to a range, and
segmenting one or more of the images based, at least in part, on one or more of the computed pseudo depth maps.

19. A computer-implemented method for segmenting an image, comprising:
receiving the image and an associated depth map;
receiving user input of control points in the depth map, each of the control points having an associated depth threshold value;
determining virtual green screen positions for the image based, at least in part, on an interpolation of the user input control points that generates a smooth manifold; and
segmenting the image based, at least in part, on thresholding using the virtual green screen positions for the image.

20. The method of claim 19, further comprising, refining the segmentation by solving a binary labeling problem in a Markov random field.

21. The method of claim 19, wherein:
the depth map is a pseudo depth map; and
pseudo depths in the pseudo depth map indicate relative depths of pixels with respect to other pixels in the pseudo depth map but not actual depth measurements.

22. A computer-implemented method for image segmentation, comprising:

receiving images captured by cameras in a camera array;
determining dense correspondences between pairs of the images captured simultaneously by two or more cameras in the camera array;
computing one or more pseudo depth maps from the dense correspondences, wherein pseudo depths in each pseudo depth map of the one or more pseudo depth maps indicate relative depths of pixels with respect to other pixels in the pseudo depth map but not actual depth measurements, and wherein computing the one or more pseudo depth maps includes:
computing initial pseudo depth maps for each satellite camera of the camera array based, at least in part, on dense correspondences to neighboring cameras and to a central camera of the camera array, and
fusing the initial pseudo depth maps to obtain one or more pseudo depth maps at the central camera; and
segmenting one or more of the images based, at least in part, on one or more of the computed pseudo depth maps.

23. The method of claim 22, wherein fusing the initial pseudo depth maps includes:
performing pre-fusion alignment to compensate for offset and scaling differences between the initial pseudo depth maps;
computing a fused pseudo depth map for each satellite camera image by solving an optimization problem to fuse initial pseudo depth maps obtained based, at least in part, on dense correspondences from the satellite camera image to a central camera image and to images from neighboring cameras of the satellite camera; and
fusing the fused pseudo depth maps for the satellite camera images at the central camera by solving the optimization problem.

24. The method of claim 23, wherein, in computing the fused pseudo depth maps and fusing the fused pseudo depth maps:
influence of less reliable estimates is downweighted based, at least in part, on computed confidences; and
edge information from the images captured by the camera array are used to refine edges of the fused pseudo depth maps and the fusion of the fused pseudo depth maps.

25. A computer-implemented method for image segmentation, comprising:
receiving images captured by cameras in a camera array;
determining optical flow fields between pairs of the images captured simultaneously by two or more cameras in the camera array;
computing a respective confidence value for each flow vector in the optical flow fields based, at least in part, on a forward-backward consistency measure specifying that a forward flow should be inverse to a backward counterpart of the foward flow;
computing one or more pseudo depth maps from the dense correspondences and using the computed confidence values, wherein pseudo depths in each pseudo depth map of the one or more pseudo depth maps indicate relative depths of pixels with respect to other pixels in the pseudo depth map but not actual depth measurements; and
segmenting one or more of the images based, at least in part, on one or more of the computed pseudo depth maps and the computed confidence values.

* * * * *

UNITED STATES PATENT AND TRADEMARK OFFICE
CERTIFICATE OF CORRECTION

PATENT NO. : 10,091,435 B2
APPLICATION NO. : 15/176017
DATED : October 2, 2018
INVENTOR(S) : Henning Zimmer et al.

It is certified that error appears in the above-identified patent and that said Letters Patent is hereby corrected as shown below:

In the Specification

In Column 3, Line 42, delete "(k', k", r)." and insert -- {k', k", r}. --, therefor.

In Column 5, Line 47, delete "$d_{k,k}$," and insert -- $d_{k,k'}$ --, therefor.

In Column 6, Line 18, delete "d" and insert -- $d_i$ --, therefor.

In Column 8, Line 48, delete "(0,1)" and insert -- {0,1} --, therefor.

In the Claims

In Column 18, Line 21, in Claim 25, delete "foward" and insert -- forward --, therefor.

Signed and Sealed this
Twenty-first Day of May, 2019

Andrei Iancu
*Director of the United States Patent and Trademark Office*